United States Patent
Takaya et al.

(10) Patent No.: US 8,804,130 B2
(45) Date of Patent: Aug. 12, 2014

(54) DISPLACEMENT MEASURING DEVICE AND DISPLACEMENT MEASURING METHOD

(75) Inventors: Yasuhiro Takaya, Suita (JP); Terutake Hayashi, Suita (JP); Masaki Michihata, Suita (JP)

(73) Assignee: Osaka University, Suita-Shi (JP)

( * ) Notice: Subject to any disclaimer, the term of this patent is extended or adjusted under 35 U.S.C. 154(b) by 78 days.

(21) Appl. No.: 13/266,782

(22) PCT Filed: Feb. 22, 2010

(86) PCT No.: PCT/JP2010/052599
§ 371 (c)(1),
(2), (4) Date: Oct. 28, 2011

(87) PCT Pub. No.: WO2010/125844
PCT Pub. Date: Nov. 4, 2010

(65) Prior Publication Data
US 2012/0068066 A1      Mar. 22, 2012

(30) Foreign Application Priority Data

Apr. 30, 2009   (JP) ................................ 2009-110246

(51) Int. Cl.
    *G01B 11/02*        (2006.01)
(52) U.S. Cl.
    USPC ........................................................ 356/498
(58) Field of Classification Search
    USPC ........... 356/318, 498, 614, 624; 977/880, 881
    See application file for complete search history.

(56) References Cited

U.S. PATENT DOCUMENTS

| 7,110,118 B2 * | 9/2006 | Unlu et al. ..................... 356/450 |
| 7,742,226 B2 * | 6/2010 | Bewersdorf et al. .......... 359/389 |
| 8,362,448 B2 * | 1/2013 | Wolleschensky et al. . 250/459.1 |

FOREIGN PATENT DOCUMENTS

| JP | 09-304266 | 11/1997 |
| JP | 2003-344402 | 12/2003 |
| JP | 2004-012244 | 1/2004 |
| JP | 2005-181085 | 7/2005 |

OTHER PUBLICATIONS

Michihata, Masaki et al. "Evaluation of Laser Trapping Probe Properties for Coordinate Measurement". Optomechatronic Sensors, Instrumentation, and Computer-Vision Systems, Proc. of SPIE vol. 6375, 637509, 2006, pp. 637509-1-637509-10.*

(Continued)

*Primary Examiner* — Michael A Lyons
(74) *Attorney, Agent, or Firm* — Mori & Ward, LLP (57) ABSTRACT

A displacement measuring device is provided which can directly measure a position and shape of a target object with high precision even if the target object has a minute shape with a high aspect ratio. A displacement measuring device 100 for measuring a change in a distance to a target object S includes a light irradiation section 10 configured to irradiate, with laser light, a light transmissive particle 50 provided at a predetermined distance from a surface of the target object S, a movement section 20 configured to move, relative to the target object S, the particle 50 held in an optical standing wave field generated by interference between light transmitted from the particle 50 and light reflected from the target object S, a sensing section 30 configured to sense a movement signal occurring when the particle 50 relatively moves against confining force caused by the optical standing wave field, and a calculation section 40 configured to derive the change in the distance to the target object S based on the movement signal.

8 Claims, 9 Drawing Sheets

(56) References Cited

OTHER PUBLICATIONS

Nakai, Daisuke et al. "Three-dimensional scanning measurement based on long working distance laser trapping probe (2nd report)—Prove characteristic in the standing wave field—". Proceedings of the Meeting of Japan Society of Precision Engineering, vol. 2009 Spring, Feb. 25, 2009, pp. 459-460.*

Neuman, Keir C. et al. "Optical trapping". Review of Scientific Instruments, vol. 75, No. 9, Sep. 2, 2004, pp. 2787-2809.*

Yan, R.H. et al. "Simultaneous gain and phase-shift enhancements in periodic gain structures". J. Appl. Phys., 67 (9), May 1, 1990, pp. 4387-4389.*

Li, T.C. et al. "Real-time control of the periodicity of a standing wave: an optical accordion". Optics Express, vol. 16, No. 8, Apr. 14, 2008, pp. 5465-5470.*

Michihata et al., "Measurement of Oscillating Condition for 3D Probing Accuracy of Microparts using the Laser trapping Probe for the Nano-CMM," ISMTII2007, Sep. 24-27, 2007, pp. 453-456.

* cited by examiner

INCLINATION ANGLE OBTAINED
FROM INCLINATION OF FITTING LINE: θ 0.97deg
AVERAGE ERROR FROM FITTING LINE: 30nm

CURVATURE RADIUS OBTAINED BY FITTING: 559 μm

FIG. 7C

TARGET OBJECT:MICRO PLANO-CONVEX LENS
MEASUREMENT RANGE:X × Y:1000 μm × 1000 μm
MEASUREMENT INTERVAL:100 μm
SCANNING HEIGHT:10 μm ABOVE FROM WORK SURFACE
SCANNING SPEED: $\nu$ =5.6 μ/s

FIG. 8A

CURVATURE RADIUS OBTAINED BY FITTING:2692 μm

FIG. 8B

MEASUREMENT RANGE: X × Y:
 2200 μm × 2000 μm
MEASUREMENT INTERVAL: 10 μm
NUMBER OF MEASUREMENT POINTS: 44421

FIG. 9A

CURVATURE RADIUS OF CENTER LINE: 2600 μm

FIG. 9B

DISPLACEMENT MEASURING DEVICE AND DISPLACEMENT MEASURING METHOD

TECHNICAL FIELD

The present invention relates to devices and methods for measuring changes in the distance to an object to be measured.

BACKGROUND ART

In recent years, advances in micromachining technology have lead to the industrial production of microparts having minute shapes on the order of micrometers. These microparts have a size ranging from several millimeters to as small as several hundreds of micrometers in, for example, electronic devices, such as digital cameras, mobile telephones, etc. Therefore, dies for manufacturing the microparts require the geometric precision on the order of sub-micrometers to nanometers. The present inventors have proposed a technique of measuring and evaluating minute shapes of microparts in a previous patent application entitled "MEASURING DEVICE AND METHOD USING PARTICLE PROBE TRAPPED BY RADIATION PRESSURE" (see Patent Document 1).

The technique described in Patent Document 1 is performed as follows. A particle having a diameter of 8 μm is irradiated with laser light and trapped by the radiation pressure of the light. The trapped particle is caused to approach an object to be measured (also referred to as a target object) while the intensity of the laser light is modulated. The vibration of the particle in this case is monitored. A change occurs in the vibration when the particle contacts the target object. Based on the change, a position of the target object is calculated. By using this technique, the present inventors have successfully measured the shape of the target object on the order of several tens of nanometers.

CITATION LIST

Patent Documents

Patent Document 1: Japanese Unexamined Patent Application Publication No. 2004-12244

SUMMARY OF THE INVENTION

Technical Problem

In Patent Document 1, as described above, in order to measure a position and shape of a target object, it is necessary to cause a particle trapped by laser light to contact the surface of the target object. However, if the target object has a minute shape with a high aspect ratio (e.g., a minute groove having a width of <8 μm and a depth of >>8 μm), the particle cannot contact a deep portion of the target object (in the previous example, the bottom of the minute groove). Therefore, in Patent Document 1, in some cases, it is difficult to measure a position and shape of the target object with high precision.

Also in Patent Document 1, as described above, a position of the target object is calculated based on a vibration change occurring when the particle contacts the target object. In the calculation in this case, a predetermined process is performed on the sensed vibration change to indirectly obtain a position of the target object. Thus, in Patent Document 1, an actual position of the target object is not directly measured with reference to a scale.

The present invention has been made in view of the above problems. It is an object of the present invention to provide a displacement measuring device and a displacement measuring method which can directly measure a position and shape of a target object with high precision even if the target object has a minute shape with a high aspect ratio.

Solution to the Problem

A displacement measuring device according to the present invention for achieving the above object is a device for measuring a change in a distance to a target object, including a light irradiation section configured to irradiate, with laser light, a light transmissive particle provided at a predetermined distance from a surface of the target object, a movement section configured to move, relative to the target object, the particle held in an optical standing wave field generated by interference between light transmitted from the particle and light reflected from the target object, a sensing section configured to sense a movement signal occurring when the particle relatively moves against confining force caused by the optical standing wave field, and a calculation section configured to derive the change in the distance to the target object based on the movement signal.

If the light transmissive particle provided at the predetermined distance from the surface of the target object is irradiated with laser light, an optical standing wave field is generated by interference between the light transmitted through the particle and the light reflected from the target object. The optical standing wave field has a periodic distribution of light energy formed between the particle and the target object, and has a sinusoidal intensity distribution for each half-wavelength ($z=\lambda/2$) of the laser light. The optical standing wave field is stably present (stationary) in space. Therefore, if the particle is placed in the optical standing wave field, the particle is confined in the vicinity of a position ($z=n\cdot\lambda/2$, where n is a natural number) where the light energy distribution has a maximum value. Therefore, the optical standing wave field may serve as a kind of scale. On the other hand, if the light transmissive particle is irradiated with laser light, the particle can be trapped by the radiation pressure of the laser light.

In this displacement measuring device, the change in the distance between the particle and the target object is measured using the particle confining force of the optical standing wave field and the particle trapping force of the radiation pressure. Specifically, the movement section which moves the particle relative to the target object is used to move the particle confined in the optical standing wave field. Here, if the trapping force which moves the particle exceeds the confining force of the optical standing wave field which confines or immobilizes the particle, so that the particle moves (jumps), a movement signal occurs. By sensing the movement signal using the sensing section, the change in the distance to the target object can be derived. Such a measurement can be achieved while keeping the particle from contacting the target object. Therefore, even if the target object has a minute shape with a high aspect ratio, a position and shape of the target object can be highly precisely measured.

The position where the particle is confined in the optical standing wave field is present at intervals (pitch) of the half-wavelength ($z=\lambda/2$) of the laser light. Therefore, the particle moves (jumps) at units of the half-wavelength ($z=\lambda/2$) of the laser light. Therefore, in this displacement measuring device, if the wavelength of the laser light is known, it can be considerably accurately determined how much the distance to the target object changes, based on the movement (jumping) of the particle. Moreover, by moving the particle relative to the target object, a position and shape of the target object can be highly precisely measured. In addition, in such a measurement technique, the change in the distance to the target object is directly measured in-situ by utilizing the periodicity of the optical standing wave field, resulting in a highly reliable measurement result on which an actual size is reflected.

The displacement measuring device of the present invention preferably further includes an adjustment section configured to adjust the wavelength of the laser light.

As described above, the particle moves (jumps) at units of the half-wavelength ($z=\lambda/2$) of the laser light. Therefore, if the adjustment section configured to adjust the wavelength of the laser light is used as in this displacement measuring device, the distance over which the particle moves (jumps) (i.e., the scale unit (resolution)) can be changed. For example, by adjusting the wavelength of the laser light to a shorter wavelength, a position and shape of the target object can be more precisely measured. As a result, a target object having a minute structure with a higher aspect ratio can be easily measured.

In the displacement measuring device of the present invention, the light irradiation section is preferably a 633-nm iodine stabilized He-Ne laser which defines the international standard of length.

The international standard of length (scale) is based on the wavelength of laser light generated by the 633-nm iodine stabilized He-Ne laser. Therefore, in this displacement measuring device, the 633-nm iodine stabilized He-Ne laser is employed as the light irradiation section. As a result, the calculation section can derive the change in the distance to the target object directly without performing a conversion process, based on the movement signal which is generated when the particle relatively moves against the confining force caused by the optical standing wave field.

In the displacement measuring device of the present invention, the movement section preferably relatively moves the particle by utilizing trapping force caused by radiation pressure of the laser light with which the light irradiation section irradiates the particle.

According to this displacement measuring device, the laser light emitted by the light irradiation section generates the optical standing wave field caused by the transmitted light and the reflected light, and at the same time, applies the trapping force caused by the radiation pressure to the particle. By using the trapping force, the movement section can relatively move the particle. Thus, in this displacement measuring device, both the particle confining force and the particle trapping force can be provided by the laser light emitted by the same light irradiation section, resulting in a simpler device.

In the displacement measuring device of the present invention, the movement section is preferably configured so that the optical standing wave field moves following the movement of the particle relative to the target object.

In this displacement measuring device, when the movement section moves the particle relative to the target object, the optical standing wave field serving as a scale moves along with the particle. Therefore, in any situation, the change in the distance to the target object can be directly measured in-situ.

In the displacement measuring device of the present invention, the movement section preferably moves the particle three-dimensionally relative to the target object.

According to this displacement measuring device, the movement section can move the particle three-dimensionally (i.e., along the X-, Y-, and Z-axes) relative to the target object. As a result, even if the target object has a three-dimensional minute structure with a high aspect ratio, a position and shape of the target object can be precisely measured.

In the displacement measuring device of the present invention, the sensing section is preferably an optical sensing section configured to sense backscattered light as the movement signal.

According to this displacement measuring device, the optical sensing section which senses backscattered light as the movement signal is employed. The backscattered light can be easily analyzed based on a change in the amount of received backscattered light. Therefore, by using the optical sensing section, a high-precision measurement result can be easily obtained. In addition, such an optical sensing section may be configured as an optical device similar to that which serves as the irradiation section. Therefore, if both the irradiation system and the measurement system are configured as optical systems, the device configuration can be simplified.

In the displacement measuring device of the present invention, the predetermined distance is preferably set to 10-270 µm.

According to this displacement measuring device, the predetermined distance between the particle and the surface of the target object is set to 10-270 µm, resulting in a more reliable measurement.

A displacement measuring method according to the present invention for achieving the above object is a method for measuring a change in a distance to a target object, including irradiating, with laser light, a light transmissive particle provided at a predetermined distance from a surface of the target object, moving, relative to the target object, the particle held in an optical standing wave field generated by interference between light transmitted from the particle and light reflected from the target object, sensing a movement signal occurring when the particle relatively moves against confining force caused by the optical standing wave field, and deriving the change in the distance to the target object based on the movement signal.

According to this displacement measuring method, advantages similar to those of the above displacement measuring device are obtained. In this displacement measuring method, the change in the distance between the particle and the target object is measured using the particle confining force of the optical standing wave field and the particle trapping force of the radiation pressure. Specifically, the particle confined in the optical standing wave field is moved relative to the target object. Here, if the trapping force which moves the particle exceeds the confining force of the optical standing wave field which confines or immobilizes the particle, so that the particle moves (jumps), a movement signal occurs. By sensing the movement signal, the change in the distance to the target object can be derived. Such a measurement can be achieved while keeping the particle from contacting the target object. Therefore, even if the target object has a minute shape with a high aspect ratio, a position and shape of the target object can be highly precisely measured.

The position where the particle is confined in the optical standing wave field is present at intervals (pitch) of the half-wavelength ($z=\lambda/2$) of the laser light. Therefore, the particle moves (jumps) at units of the half-wavelength ($z=\lambda/2$) of the laser light. Therefore, in this displacement measuring method, if the wavelength of the laser light is known, it can be considerably accurately determined how much the distance to the target object changes, based on the movement (jumping) of the particle. Moreover, by moving the particle relative to the target object, a position and shape of the target object can be highly precisely measured. In addition, in such a measurement technique, the change in the distance to the target object is directly measured in-situ by utilizing the periodicity of the optical standing wave field, resulting in a highly reliable measurement result on which an actual size is reflected.

The displacement measuring method of the present invention preferably further includes adjusting a wavelength of the laser light.

According to this displacement measuring method, by adjusting the wavelength of the laser light, the distance over which the particle moves (jumps) (i.e., the scale unit (resolution)) can be changed. For example, by adjusting the wavelength of the laser light to a shorter wavelength, a position and shape of the target object can be more precisely measured. As a result, a target object having a minute structure with a higher aspect ratio can be easily measured.

In displacement measuring method of the present invention, the irradiating preferably includes specifying a reference point where the weight of the particle is balanced by trapping force lifting the particle.

According to this displacement measuring method, when the particle is initially irradiated with the laser light, the laser light is adjusted so that the weight of the particle is balanced by the trapping force, and the balanced position is specified as a reference point. By measuring the displacement of the particle after the reference point is specified, the displacement from the reference point can be more precisely measured.

DESCRIPTION OF EMBODIMENTS

Embodiments related to a displacement measuring device and a displacement measuring method according to the present invention will be described with reference to the accompanying drawings. Note that the present invention is not intended to be limited to specific forms set forth herein, but on the contrary, it is intended to cover equivalents thereof.

[Principle of Measurement]

Figure 1A:
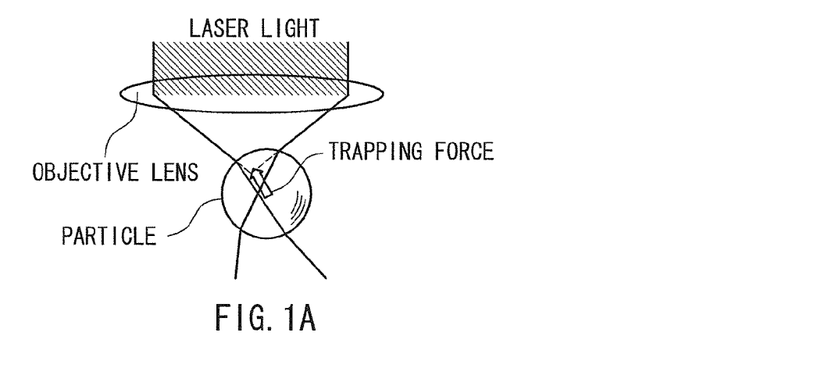
FIGS. 1A to 1C are diagrams for describing the measurement principle of the present invention.
Figure 1B:
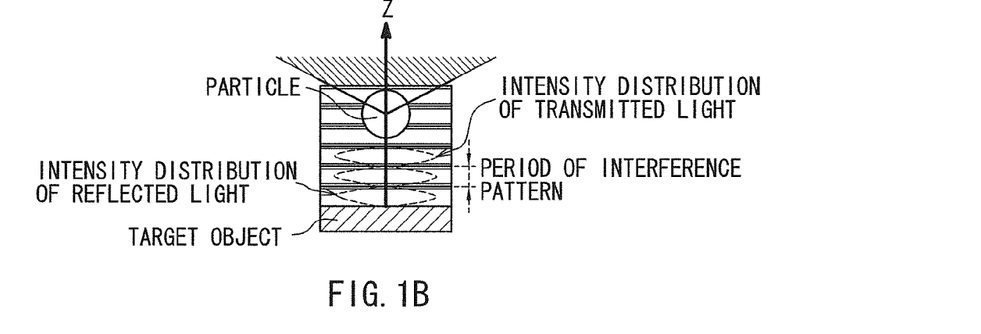
Figure 1C:
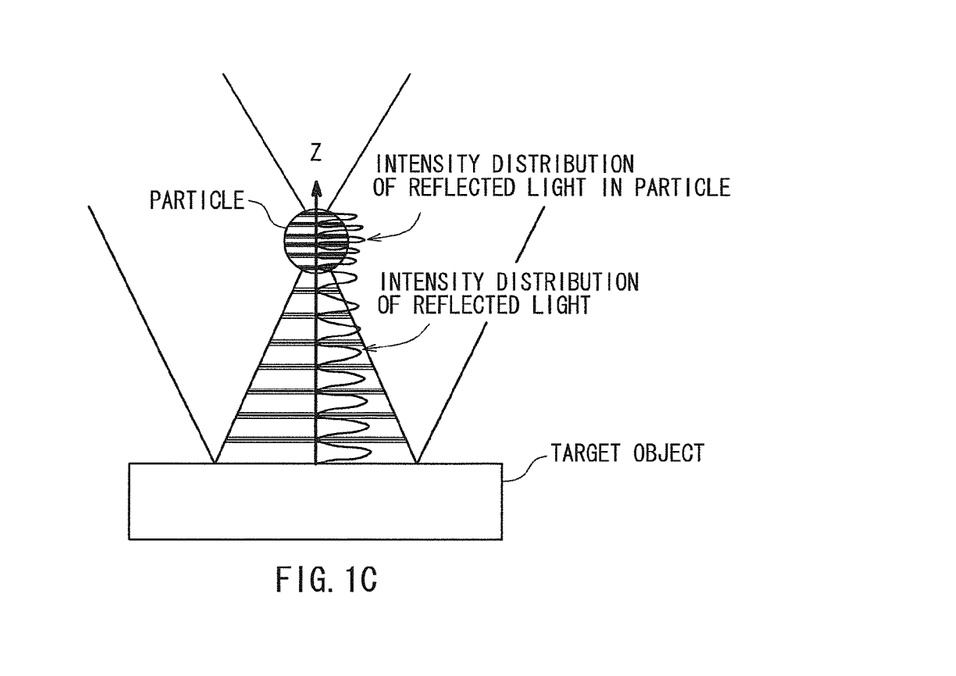

Firstly, the principle of measurement in the present invention will be described with reference to FIGS. 1A to 1C. In the present invention, a light transmissive particle (e.g., a silica particle) is employed as a probe for measuring a change in a distance to an object to be measured (also referred to as a target object). FIG. 1A is a diagram for describing trapping force acting on the particle. FIG. 1B is a diagram for describing an optical standing wave field which confines the particle. FIG. 1C is a diagram for describing an intensity distribution on the Z-axis of reflected light within the particle.

As shown in FIG. 1A, when the particle is irradiated with laser light collected by an objective lens, a portion of the laser light entering the particle is refracted at a boundary surface between the particle and the outside (the atmosphere). In this case, radiation pressure is applied to the particle. The radiation pressure acts as trapping force which lifts the particle toward the laser light (upward in FIG. 1A). Therefore, by adjusting the trapping force to be greater than or equal to the particle's own weight, the particle can be held in the air.

On the other hand, if the light transmissive particle is irradiated with laser light while the particle is located at a predetermined distance from a surface of the target object, an optical standing wave field is generated by interference between the light transmitting through the particle and the light reflected from the target object. The optical standing wave field is a periodic distribution of light energy formed between the particle and the target object. As shown in FIG. 1B, the optical standing wave field has a sinusoidal intensity distribution for each half-wavelength ($z=\lambda/2$) of the laser light. The optical standing wave field is stably present (stationary) in space. Therefore, if the particle is placed in the optical standing wave field, the particle is confined at a position ($z=n\cdot\lambda/2$, where n is a natural number) where the light energy distribution has a maximum value.

As shown in FIG. 1C, if the particle is irradiated with laser light, the light reflected from the target object is transmitted through the particle. The distance between two adjacent peaks of the intensity of the reflected light in the air is different from that in the particle. This is because the air and the particle have different refractive indices.

The measurement principle of the present invention has been described above with reference to FIG. 1. For example, if a particle (particle size: 8 μm, mass: 5 pN) is irradiated with laser light (wavelength ($\lambda$): 1064 nm), an optical standing wave field (pitch of the optical standing wave ($\lambda/2$): 532 nm) is generated. The trapping force applied to the particle is several hundreds of piconewtons (pN).

In the displacement measuring device and the displacement measuring method of the present invention, a change in a distance between the particle and the target object is measured using the particle confining force of the optical standing wave field and the particle trapping force of the radiation pressure. This measurement will be specifically described with reference to FIGS. 2A and 2B.

Figure 2A:
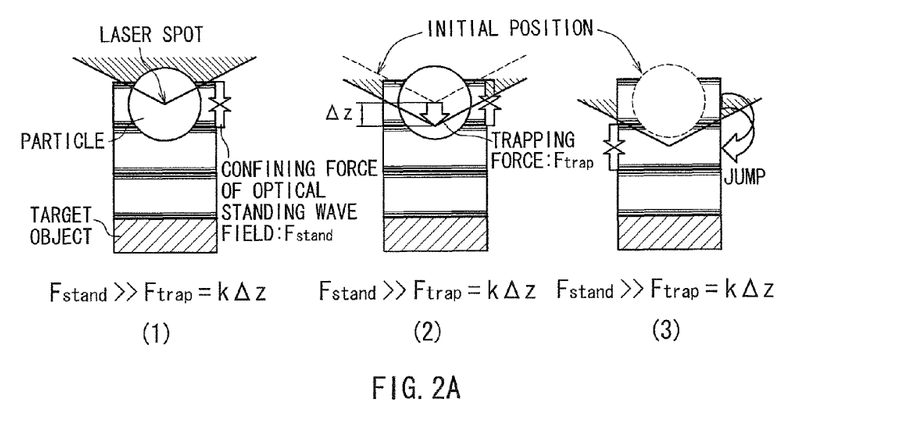
FIGS. 2A and 2B are schematic diagrams showing how a change in a distance to a target object is measured by moving a particle relative to the target object.
Figure 2B:
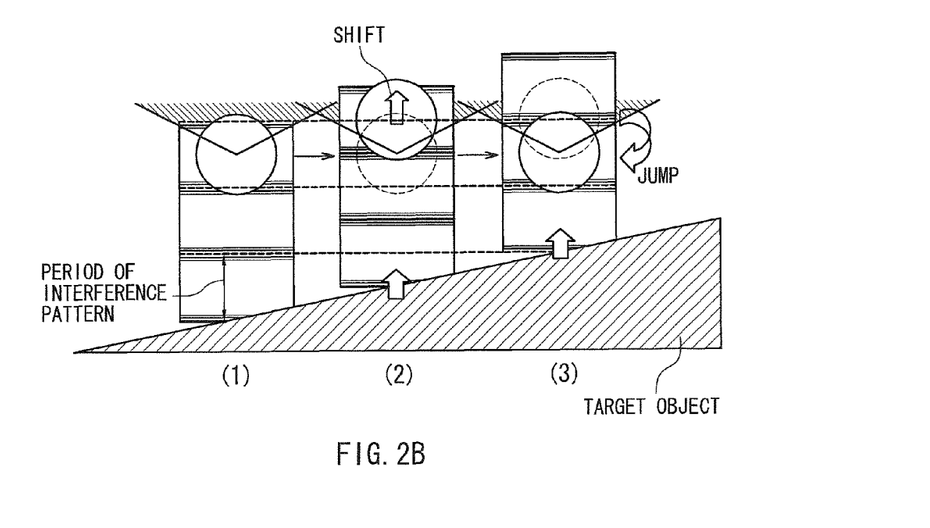

FIGS. 2A and 2B are schematic diagrams showing how the change in the distance to a target object is measured by moving the particle relative to the target object. FIG. 2A shows a case where the particle (laser spot) is moved toward a flat target object. In FIG. 2A, (1) shows a situation in which the confining force ($F_{stand}$) of the optical standing wave field is sufficiently greater than the trapping force ($F_{trap}$) of the radiation pressure. In this case, the particle is confined in the vicinity of a position where the light energy distribution of the optical standing wave field has a maximum value. Next, as shown in (2), if the laser spot of the laser light is moved toward the target object, the trapping force directed toward the target object (downward in FIG. 2A) gradually increases. As shown in (3), if the trapping force exceeds the confining force, the particle moves (jumps) toward the target object by the half period ($\lambda/2$) of the optical standing wave field. FIG. 2B shows a case where the particle is moved laterally relative to a target object having an inclined surface. In FIG. 2B, (1) shows a situation in which the confining force ($F_{stand}$) of the optical standing wave field is sufficiently greater than the trapping force ($F_{trap}$) of the radiation pressure. In this case, the particle is confined in the vicinity of a position in the optical standing wave field where the light energy distribution has a maximum value. Next, as shown in (2), if the laser spot of the laser light is moved laterally relative to the inclined surface of the target object, the confining force shifts the particle in a direction in which the particle moves away from the inclined surface. In this case, the horizontal height position of the laser spot is not changed, and therefore, the trapping force directed toward the target object gradually increases. As shown in (3), if the trapping force exceeds the confining force, the particle moves (jumps) toward the target object by the half period ($\lambda/2$) of the optical standing wave field. The displacement measurement has been specifically described with reference to FIGS. 2A and 2B. In the displacement measuring method of the present invention, when a particle is initially irradiated with laser light, the laser light is adjusted so that the weight of the particle is balanced by the trapping force, and the balanced position is specified as a reference point. By measuring the displacement of the particle after the reference point is specified, the displacement from the reference point can be more precisely measured. The reference point may be specified on the XY plane perpendicular to the Z-axis.

Figure 3A:
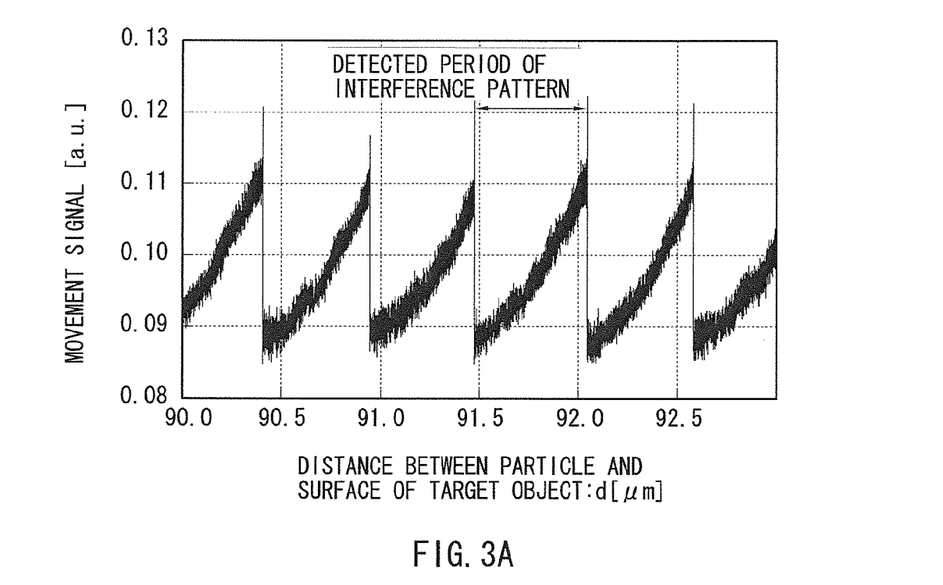
FIGS. 3A and 3B are graphs showing a result of examination of the periodicity of an optical standing wave field.
Figure 3B:
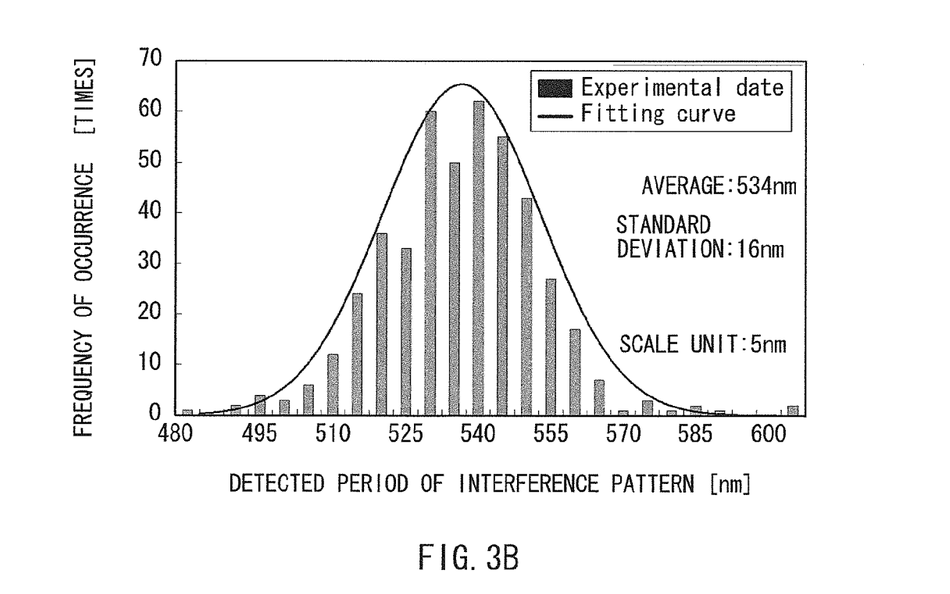

Here, as described above, the optical standing wave field has a stable periodicity. FIGS. 3A and 3B show graphs indicating results of examining the periodicity of the optical standing wave field. FIG. 3A shows a movement signal (probe signal) which is sensed when the particle is moved relative to the target object in the optical standing wave field. The movement signal can be obtained based on changes in the amount of received backscattered light from the particle. FIG. 3B shows a distribution of sensed periodicities (interference patterns) of the optical standing wave field. According to the graphs of FIGS. 3A and 3B, it is observed that the sensed periodicities (average: 534 nm) of the optical standing wave field are substantially equal to the half-wavelength (532 nm) of the laser light. Therefore, in the present invention, the periodicity of the optical standing wave field is utilized as a kind of scale. Specifically, when the particle is moved relative to the target object, the movement (jumping) of the particle by the half-wavelength in the optical standing wave field is sensed as a movement signal. As described below, the movement signal is sensed as a change in the amount of received backscattered light of the particle. As a result, the change in the distance to the target object can be derived considerably precisely (on the order of nanometers) in a non-contact manner. Therefore, even if the target object has a minute shape with a high aspect ratio, a position and shape of the target object can be precisely obtained. Moreover, in such a measurement technique, the change in the distance to the target object is directly measured in-situ by utilizing the periodicity of the optical standing wave field, resulting in a highly reliable measurement result on which an actual size is reflected. Next, a specific configuration of the present invention will be described which can be implemented using the above-mentioned measurement principle.

[Configuration of Displacement Measuring Device]

Figure 4:
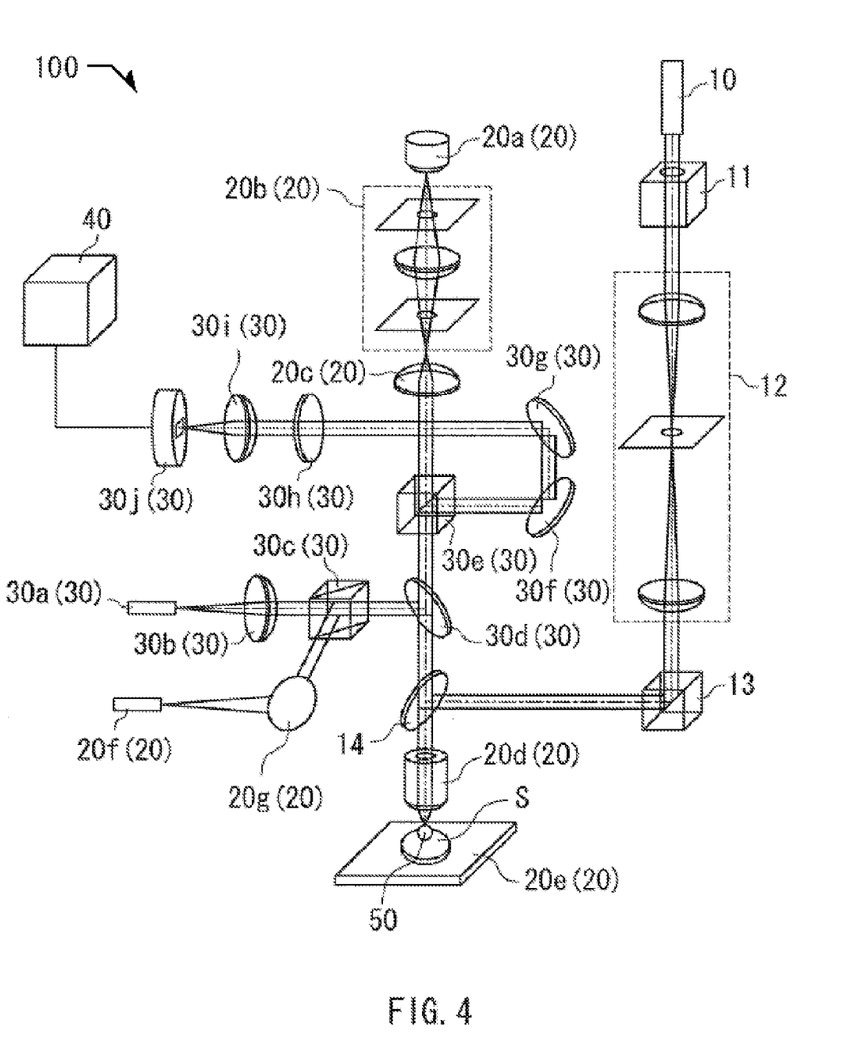
FIG. 4 is a schematic diagram showing a displacement measuring device according to the present invention.

FIG. 4 is a schematic diagram showing the displacement measuring device 100 of the present invention. The displacement measuring device 100 includes, as main components, a light irradiation section 10, a movement section 20, a sensing section 30, and a calculation section 40. The displacement measuring device 100 may be combined with an optical microscope. In this case, the optical microscope also serves as the movement section 20. Therefore, in the description that follows, the optical microscope may be indicated by a reference character 20.

Figure 5:
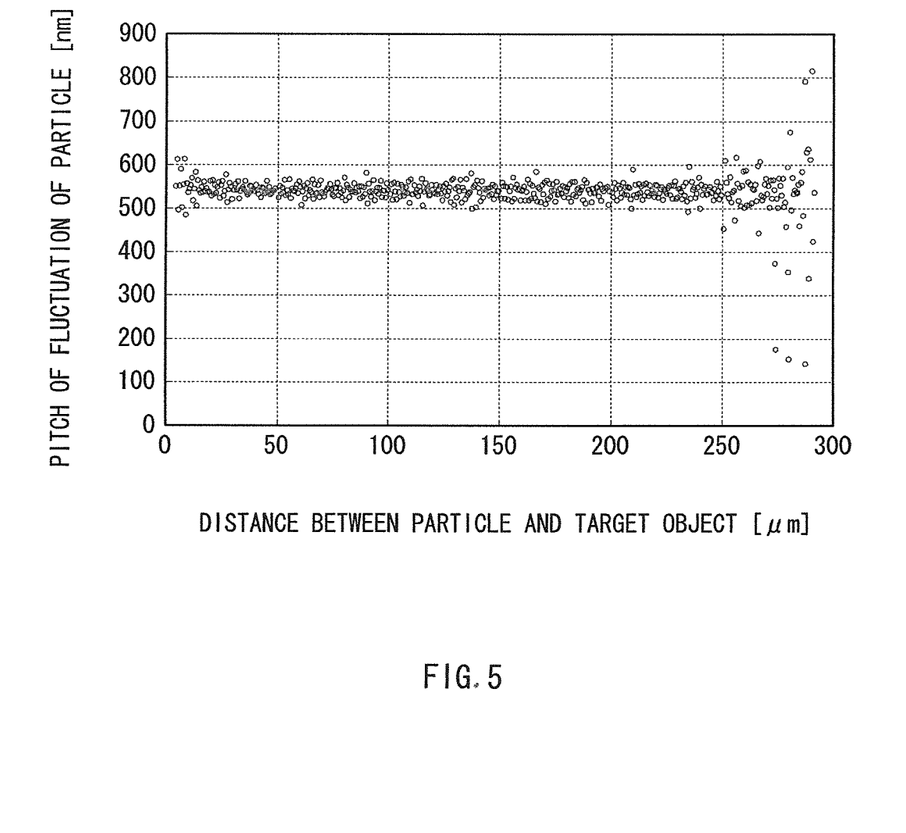
FIG. 5 is a graph showing the relationship between the distance between the particle and the target object, and the pitch of fluctuation of the particle.

The light irradiation section 10 is a device which irradiates a light transmissive particle 50 with laser light. In this embodiment, the particle 50 is an 8-µm silica sphere, and is located at a distance of 10-270 µm from a target object S. A reason why the particle 50 is located at such a distance is that if the distance is less than 10 µm, the intensity of light reflected from the target object S is great, so that the confining force for the particle 50 is great. In this case, the trapping force, which is supposed to exceed the confining force, is also great, so that there is a high probability that the particle jumps over double the half-wavelength (interference pattern) (i.e., jumps over $\lambda$). On the other hand, if the distance is greater than 270 µm, the contrast of the periodicity (interference pattern) of the optical standing wave field is low, so that there are variations in the pitch of fluctuation of the particle 50. FIG. 5 is a graph showing the relationship between the distance between the particle 50 and the target object S, and the pitch of fluctuation of the particle 50. The light irradiation section 10 is, for example, a CW laser, which emits continuous light. The wavelength of the laser light may be set to any value. In this embodiment, the wavelength $\lambda$ of the laser light is 1064 nm. Note that an adjustment section (not shown) may be provided in the light irradiation section 10 to cause the wavelength of the laser light to be variable. In this case, the distance over which the particle 50 moves (jumps) (i.e., the scale unit (resolution)) is variable. For example, by adjusting the wavelength of the laser light to a shorter wavelength, a position and shape of the target object S can be more precisely measured. As a result, a target object S having a minute structure with a higher aspect ratio can be easily measured. Alternatively, as the light irradiation section 10, a 633-nm iodine stabilized He-Ne laser which defines the international standard of length may be effectively used. In this case, the calculation section 40 described below can derive the change in the distance to the target object S directly without performing a conversion process, based on the movement signal which is generated when the particle 50 relatively moves against the confining force caused by the optical standing wave field. The laser light emitted by the light irradiation section 10 is transmitted through an acousto-optic deflector (AOD) 11, a laser relay lens system 12, a reflecting prism 13, and a harmonic separator 14 into an objective lens 20d of the optical microscope 20. The objective lens 20d focuses the laser light on the particle 50. The light transmitted through the particle 50 and the light reflected from the target object S interfere with each other, so that an optical standing wave field is formed between the particle 50 and the target object S.

The optical microscope 20 includes a CCD camera 20a, a microscope relay lens system 20b, a tube lens 20c, the objective lens 20d, a stage 20e, a light source 20f, and a mirror 20g. The user of the displacement measuring device 100 checks a position of the trapped particle 50 using the CCD camera 20a before operating the optical microscope (movement section) 20 to move, relative to the target object S, the particle 50 held in the optical standing wave field generated by the interference between the light transmitted through the particle 50 and the light reflected from the target object S. For example, the stage 20e of the optical microscope 20 on which the target object S is placed is moved three-dimensionally (i.e., along the X-, Y-, and Z-axes) relative to the target object. As a result, even if the target object S has a three-dimensional minute structure with a high aspect ratio, a position and shape of the target object S can be precisely measured. On the other hand, the objective lens 20d itself may be movable. In these cases, the standing wave field serving as a scale moves following the movement of the particle 50 trapped by the irradiation with the laser light from the objective lens 20d. Thus, in this embodiment, the change in the distance to the target object S can be directly measured in-situ.

The sensing section 30 includes a sensing laser 30a, a collimator lens 30b, a first half prism 30c, a half mirror 30d, a second half prism 30e, a first mirror 30f, a second mirror 30g, an interference filter 30h, a lens 30i, and a photo-detector (PD) 30j. The sensing section 30 senses the movement signal which is generated when the particle 50 relatively moves against the confining force caused by the optical standing wave field. Specifically, the sensing laser 30a emits laser light having a wavelength (e.g., λ=640 nm) different from that of the laser light emitted by the light irradiation section 10 to irradiate the particle 50 which is being measured. Backscattered light occurring in this case is sensed by the photo-detector (PD) 30j. The sensing result is transmitted to and analyzed by the calculation section 40.

The calculation section 40 derives the change in the distance to the target object S based on the movement signal (the amount of received backscattered light) sensed by the sensing section 30. For example, the calculation section 40 analyzes the change in the distance between the particle 50 and the target object S based on a change in the amount of received backscattered light entering the photo-detector (PD) 30j. By using such an analysis technique, a high-precision measurement result can be easily obtained. The calculation section 40 may, for example, be implemented using a general-purpose personal computer.

Next, example applications of the displacement measuring device 100 of the present invention will be described.

EXAMPLE 1

Figure 6A:
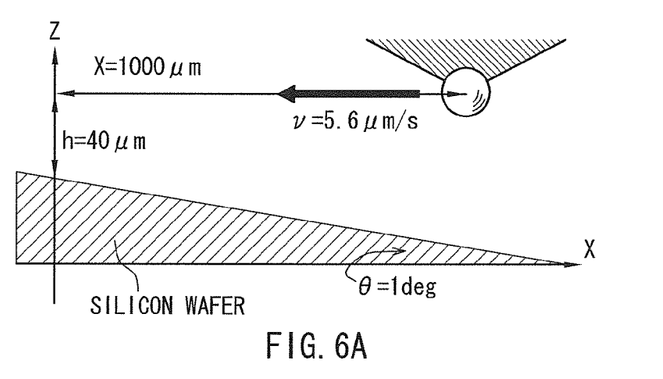
FIGS. 6A to 6C are diagrams for describing conditions for a "displacement measurement for a flat surface" performed as Example 1, and the result of the measurement.
Figure 6B:
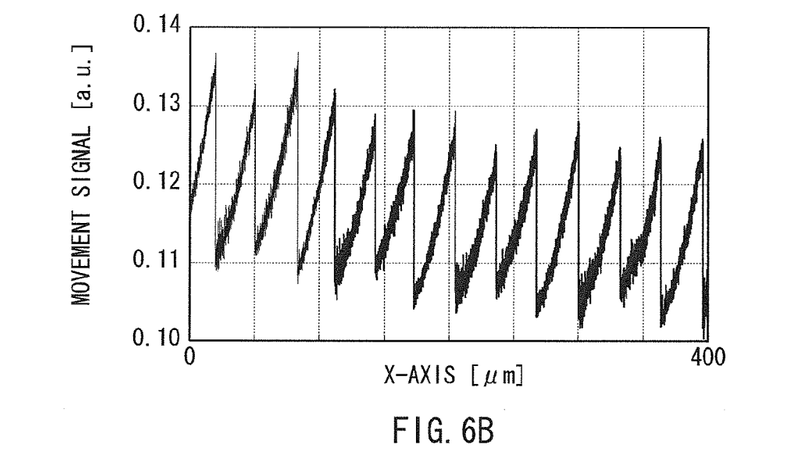
Figure 6C:
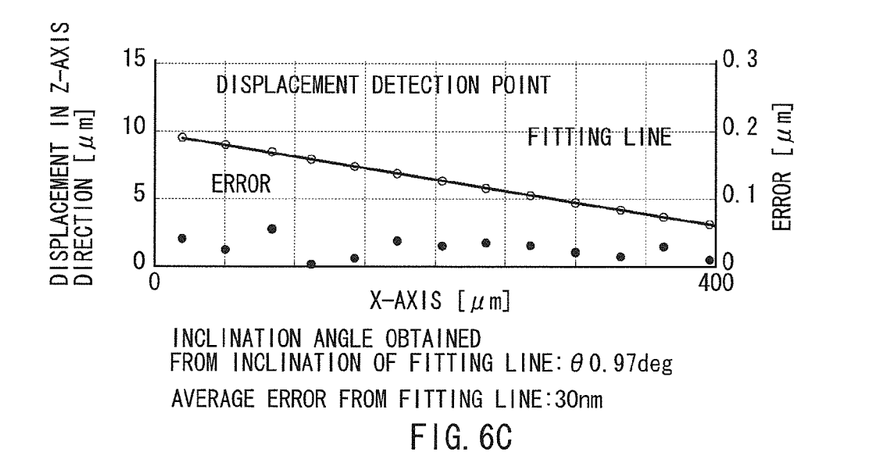

FIGS. 6A to 6C are diagrams for describing conditions for a "displacement measurement for a flat surface" performed as Example 1, and the result of the measurement. In this example, a silicon wafer having an inclined surface with θ=1 degree was used as the target object S, and the displacement measuring device 100 of the present invention was used to determine how precisely the minute structure of the silicon wafer can be measured.

The silicon wafer was placed on the stage 20e of the optical microscope. The particle 50 serving as a probe was placed on the silicon wafer. The particle 50 was irradiated with laser light emitted by the irradiation section 10. The particle confined in the optical standing wave field was relatively moved using trapping force caused by the radiation pressure. The measurement conditions were as follows. As shown in FIG. 6A, the distance (scanning height) between the particle 50 and a surface of the silicon wafer was 40 µm or more, the movement direction was the X-axis direction, the movement speed (scanning speed) was 5.6 µm/s, and the movement distance was 1000 µm. As a result of the measurement, a movement signal shown in a graph of FIG. 6B was sensed as backscattered light from the particle 50. This was plotted as displacements from the X-axis in the Z-axis direction to obtain a graph of FIG. 6C. In FIG. 6C, a line was fitted to the displacement detection points, and the inclination angle was calculated from the fitted line to be θ=0.97 degrees. The error from the fitted line was 30 nm. The value (θ=0.97 degrees) of the inclination angle calculated by the calculation was considerably close to the actual angle (θ=1 degree) of the inclined surface of the silicon wafer. Thus, this example clarified that the displacement measurement for a flat surface can be highly precisely achieved.

EXAMPLE 2

Figure 7A:
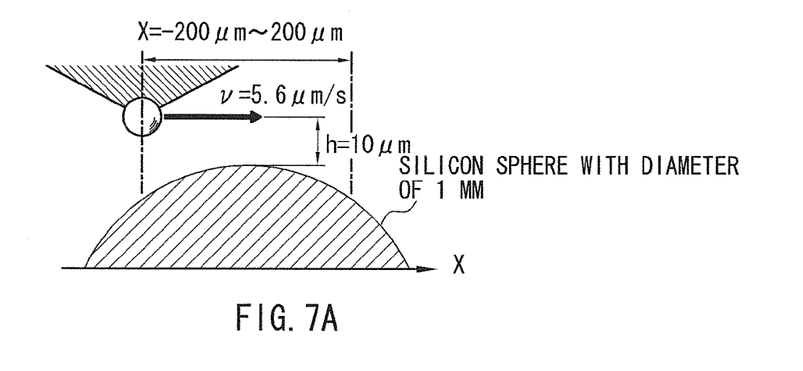
FIGS. 7A to 7C are diagrams for describing conditions for a "two-dimensional displacement measurement for a free curved surface" performed as Example 2, and the result of the measurement.
Figure 7B:
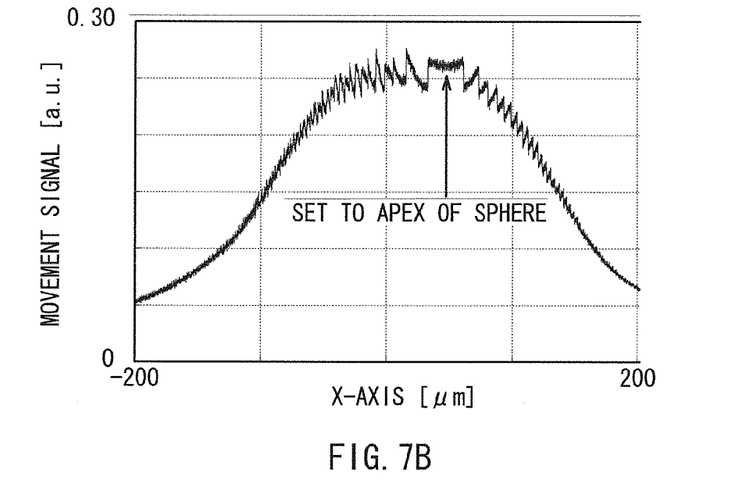
Figure 7C:
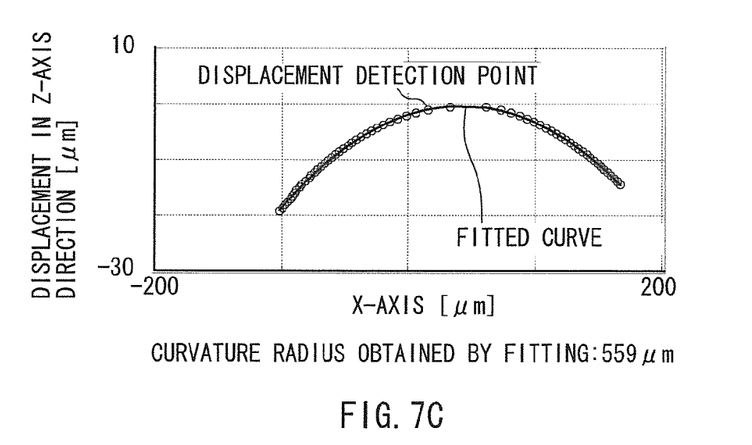

FIGS. 7A to 7C are diagrams for describing conditions for a "two-dimensional displacement measurement for a free curved surface" performed as Example 2, and the result of the measurement. In this example, a silicon sphere was used as the target object S, and the displacement measuring device 100 of the present invention was used to obtain a two-dimensional minute structure of a free curved surface of the silicon sphere by the displacement measurement.

The silicon sphere to be measured had a diameter of 1 mm. The measurement conditions were as follows. As shown in FIG. 7A, the measurement range was a range which covers an apex of the silicon sphere (−200 µm to 200 µm in the X-axis direction), the distance (scanning height) between the particle 50 and a surface of the silicon sphere was 10 µm or more, and the relative movement speed (scanning speed) of the particle 50 was 5.6 µm/s. As a result of the measurement, a movement signal shown in a graph of FIG. 7B was sensed as backscattered light from the particle 50. This was plotted as displacements from the X-axis in the Z-axis direction to obtain a graph of FIG. 7C. In FIG. 7C, a curve was fitted to the displacement detection points, and the radius curvature was calculated from the fitted curve to be 559 µm. The value (559 µm) of the curvature radius obtained by the calculation was close to the theoretical value (500 µm) of the actual radius curvature of the silicon wafer. Thus, this example clarified that the two-dimensional displacement measurement for a free curved surface can be highly precisely achieved.

EXAMPLE 3

Figure 8A:
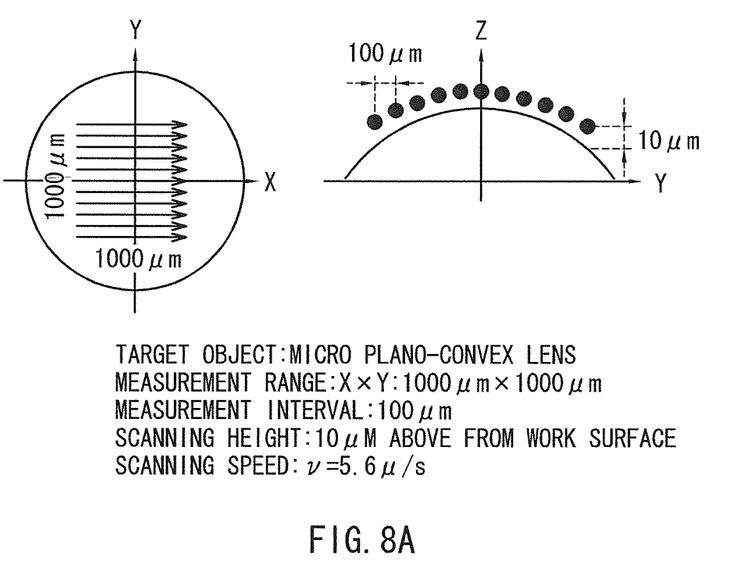
FIGS. 8A and 8B are diagrams for describing conditions for a "three-dimensional displacement measurement for a free curved surface" performed as Example 3, and the result of the measurement.
Figure 8B:
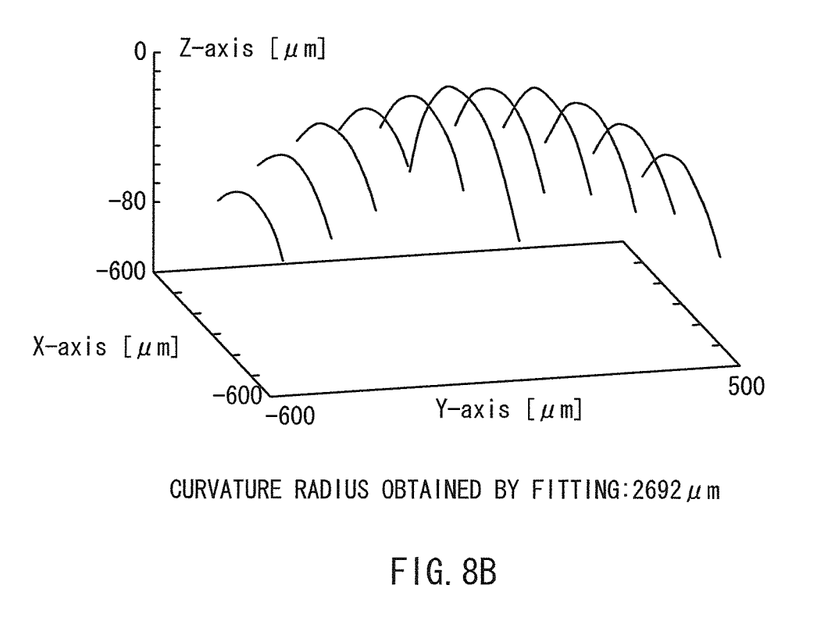

FIGS. 8A and 8B are diagrams for describing conditions for a "three-dimensional displacement measurement for a free curved surface" performed as Example 3, and the result of the measurement. In this example, a micro plano-convex lens was used as the target object S, and the displacement measuring device 100 of the present invention was used to obtain a three-dimensional minute structure of a free curved surface of the micro plano-convex lens by the displacement measurement.

The micro plano-convex lens is formed by integrating a disk-shaped member having a convex surface on a top surface of a cylindrical member. The micro plano-convex lens is made of LaSFN9 manufactured by Schott AG in Germany and has a diameter of 2 mm. The measurement conditions were as follows. As shown in FIG. 8A, the measurement range was a range which covers an apex of the micro plano-convex lens as viewed from above (1000 µm in the X-axis direction and 1000 µm in the Y-axis direction), the measurement interval was 100 µm, the distance (scanning height) between the particle 50 and a surface of the micro plano-convex lens was 10 µm, and the relative movement speed (scanning speed) of the particle 50 was 5.6 µm/s. The result of the measurement was plotted three-dimensionally to obtain a graph of FIG. 8B. In FIG. 8B, the radius curvature was calculated from fitting to data to be 2692 µm.

Figure 9A:
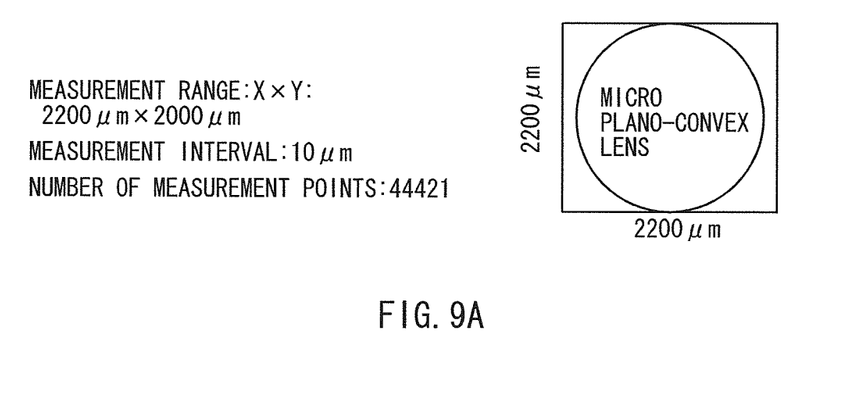
FIGS. 9A and 9B are diagrams for describing measurement conditions and measurement results for a confocal laser microscope for comparison.
Figure 9B:
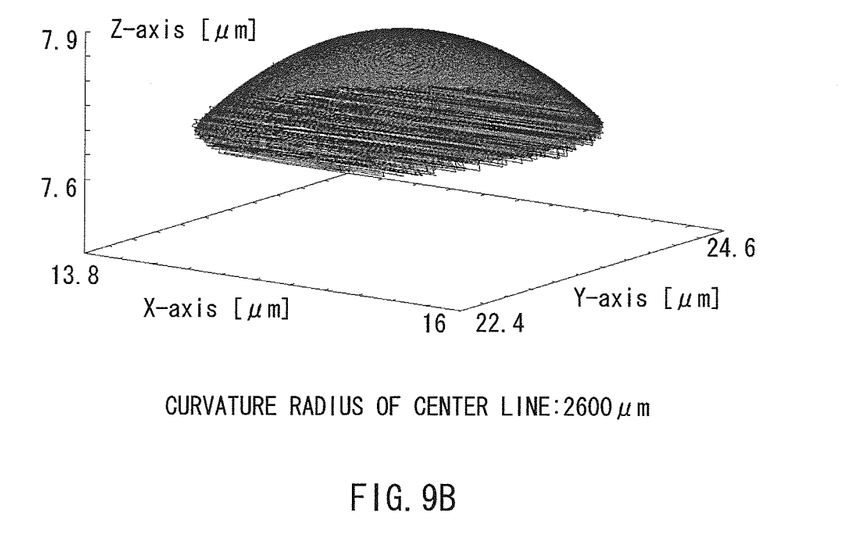

Next, for comparison, a confocal laser microscope was used to measure the curvature radius of the same micro plano-convex lens. FIGS. 9A and 9B are diagrams for describing measurement conditions and measurement results for the confocal laser microscope. The measurement conditions for this comparative test were as follows. As shown in FIG. 9A, the measurement range was a range which covers the entire micro plano-convex lens as viewed from above (2200 μm in the X-axis direction and 2000 μm in the Y-axis direction), the measurement interval was 10 μm, and the number of measurement points was 44,421. The measurement result was plotted three-dimensionally to obtain a graph of FIG. 9B. In FIG. 9B, the curvature radius of a center line was calculated to be 2600 μm.

The measurement result of this example (curvature radius: 2692 μm) was close to that (curvature radius: 2600 μm) which was obtained by using the confocal laser microscope for comparison. Thus, this example clarified that the three-dimensional displacement for a free curved surface can be highly precisely achieved.

INDUSTRIAL APPLICABILITY

The displacement measuring device and displacement measuring method of the present invention are preferably useful for high-precision three-dimensional coordinate measuring machines (Nano-CMM) for evaluating the three-dimensional shape of an object in a non-contact manner.

DESCRIPTION OF REFERENCE CHARACTERS

10 LIGHT IRRADIATION SECTION
20 MOVEMENT SECTION
30 DETECTION SECTION
40 CALCULATION SECTION
50 PARTICLE
100 DISPLACEMENT MEASURING DEVICE
S TARGET OBJECT

The invention claimed is:

1. A displacement measuring device for measuring a change in a distance to a target object, comprising:
   a light irradiation section configured to irradiate, with laser light, a light transmissive particle provided at a predetermined distance from a surface of the target object;
   a movement section configured to move, relative to the target object, the particle held in an optical standing wave field generated by interference between light transmitted from the particle and light reflected from the target object;
   a sensing section configured to sense a movement signal occurring when the particle moves, relative to the target object, against confining force caused by the optical standing wave field;
   a calculation section configured to derive the change in the distance to the target object based on the movement signal and;
   an adjustment configured to adjust wavelength of the laser light,
   wherein the adjustment section adjusts the wavelength of the laser light to adjust a periodicity of the optical standing wave field.

2. The displacement measuring device of claim 1, wherein the movement section relatively moves the particle by utilizing trapping force caused by radiation pressure of the laser light with which the light irradiation section irradiates the particle.

3. The displacement measuring device of claim 1, wherein the movement section is configured so that the optical standing wave field moves following the movement of the particle relative to the target object.

4. The displacement measuring device of claim 1, wherein the movement section moves the particle three-dimensionally relative to the target object.

5. The displacement measuring device of claim 1, wherein the sensing section is an optical sensing section configured to sense backscattered light as the movement signal.

6. The displacement measuring device of claim 1, wherein the predetermined distance is set to 10-270 μm.

7. A method for measuring a change in a distance to a target object, comprising:
   irradiating, with laser light, a light transmissive particle provided at a predetermined distance from a surface of the target object;
   moving, relative to the target object, the particle held in an optical standing wave field generated by interference between light transmitted from the particle and light reflected from the target object, periodicity of the optical standing wave field adjusted through adjustment of a wavelength of the laser light;
   sensing a movement signal occurring when the particle relatively moves against confining force caused by the optical standing wave field; and
   deriving the change in the distance to the target object based on the movement signal.

8. The method of claim 7, wherein the irradiating includes specifying a reference point where weight of the particle is balanced by trapping force lifting the particle.

* * * * *